(12) United States Patent
Li et al.

(10) Patent No.: US 10,579,303 B1
(45) Date of Patent: Mar. 3, 2020

(54) MEMORY CONTROLLER HAVING COMMAND QUEUE WITH ENTRIES MERGING

(71) Applicant: Candace Design Systems, Inc., San Jose, CA (US)

(72) Inventors: Xiaofei Li, Beijing (CN); Ying Li, Shanghai (CN); Zhehong Qian, Shanghai (CN); Buying Du, Beijing (CN)

(73) Assignee: Candace Design Systems, Inc., San Jose, CA (US)

( * ) Notice: Subject to any disclaimer, the term of this patent is extended or adjusted under 35 U.S.C. 154(b) by 302 days.

(21) Appl. No.: 15/249,036

(22) Filed: Aug. 26, 2016

(51) Int. Cl.
*G06F 12/02* (2006.01)
*G06F 3/06* (2006.01)

(52) U.S. Cl.
CPC .......... *G06F 3/0659* (2013.01); *G06F 3/0611* (2013.01); *G06F 3/0683* (2013.01)

(58) Field of Classification Search
None
See application file for complete search history.

(56) References Cited

U.S. PATENT DOCUMENTS

| | | | |
|---|---|---|---|
| 5,022,004 A | 6/1991 | Kurtze et al. | |
| 6,233,665 B1* | 5/2001 | Bolyn | G06F 12/0817 711/118 |
| 6,601,117 B1* | 7/2003 | Dahlen | G06F 5/065 710/310 |
| 6,738,831 B2 | 5/2004 | Wolrich et al. | |
| 7,492,368 B1* | 2/2009 | Nordquist | G06F 13/161 345/502 |
| 8,498,074 B1 | 7/2013 | Mobley et al. | |
| 9,280,479 B1* | 3/2016 | Kruckemyer | G06F 12/0871 |
| 2007/0150672 A1 | 6/2007 | Alexander et al. | |

(Continued)

OTHER PUBLICATIONS

Ausavarungnirun, Rachata, et al., "Staged Memory Scheduling: Achieving High Performance and Scalability in Heterogeneous Systems", *Proceedings of the 39th Annual International Symposium on Computer Architecture (ISCA '12)*, (2012), 416-427.

(Continued)

*Primary Examiner* — Charles Rones
*Assistant Examiner* — Ryan Dare
(74) *Attorney, Agent, or Firm* — Schwegman Lundberg & Woessner, P.A.

(57) ABSTRACT

Aspects of the present disclosure involve an apparatus including a port interface coupled with a data bus to receive memory transaction commands, and a command queue coupled with the port interface. Additional aspects include methods of operating such an apparatus, and electronic design automation (EDA) devices to generate design files associated with such an apparatus. The command queue includes a plurality of memory entries to store memory transaction commands, a placement logic module to combine a received memory transaction command with a memory transaction command previously stored in one of the plurality of memory entries of the command queue, and a selection logic module to determine an order to transmit memory transaction commands stored in the plurality of memory entries and transmit the stored memory transaction commands according to the determined order to a memory interface.

20 Claims, 12 Drawing Sheets

(56) References Cited

U.S. PATENT DOCUMENTS

| | | | | |
|---|---|---|---|---|
| 2008/0126641 | A1* | 5/2008 | Irish | G06F 13/1631 710/112 |
| 2011/0078393 | A1* | 3/2011 | Lin | G06F 13/1642 711/155 |
| 2015/0254009 | A1* | 9/2015 | Eguchi | G06F 3/0619 711/103 |
| 2016/0118110 | A1* | 4/2016 | Kim | G11C 11/5628 365/185.03 |

OTHER PUBLICATIONS

Cuijuan, Wu, et al., "A Disk Performance Optimizing Algorithm by Adjusting the Native Command Queue Based on Rotational Position", *2011 International Conference on Computer Science and Network Technology*, (2011), 829-833.

Lee, Chanho, "Arbitration and Shuffling Algorithm for Processing Multiple Commands in SDRAM Controller", *2014 IEEE International Conference on Consumer Electronics (ICCE)*, (2014), 319-320.

Rebel, Gregor, et al., "Interrupt aware Queue Implementation for Energy Efficient Multitasking Systems based on Cortex-M3 Architecture", *2014 9th International Symposium on Reconfigurable and Communication-Centric Systems-on-Chip (ReCoSoC)*, (2014), 7 pgs.

Wu, Cuijuan, et al., "A Disk Performance Optimizing Algorithm by Adjusting the Native Command Queue Based on Rotational Position", *2011 International Conference on Computer Science and Network Technology*, (2011), 829-833.

* cited by examiner

MEMORY CONTROLLER HAVING COMMAND QUEUE WITH ENTRIES MERGING

TECHNICAL FIELD

The subject matter disclosed herein relates to computer memory controllers. In particular, example embodiments relate to a memory controller having a command queue with entries merging.

BACKGROUND

A command queue is used in memory controllers for computer systems. In order to efficiently process an outstanding number of memory transactions, the command queue may accept memory transactions to be scheduled, rearrange the schedule of the accepted memory transactions, store the scheduled transactions in queue entries within the command queue, select the stored transactions to be output according to specific rules, and output the memory transactions for transmission on a memory interface to a memory device.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Embodiments described herein relate to electronic design automation (EDA), and to systems, methods, devices, and instructions for generation of circuit design files. Some embodiments pertain to enhanced techniques for controlling computer memory. By merging entries of a command queue of a memory controller, these enhanced techniques significantly reduce the size of command queue for a given level of throughput and improve command queue performance compared to traditional techniques.

The following description and the drawings illustrate specific embodiments to enable those skilled in the art to practice them. Other embodiments may incorporate structural, logical, electrical, process, and other changes. Portions and features of some embodiments may be included in, or substituted for, those of other embodiments. Elements of the embodiments described herein are intended to cover all available equivalents of the elements described.

Without limitation, the disclosed exemplary embodiments are described in the context of industry standard double data rate (DDR) computer memory systems. While the systems and methods involved in these example embodiments may find particular application in DDR computer memory systems, this should not be construed as limiting, as the systems and methods described herein may equally well find application in other systems and methods involving computer command processing.

Figure 1:
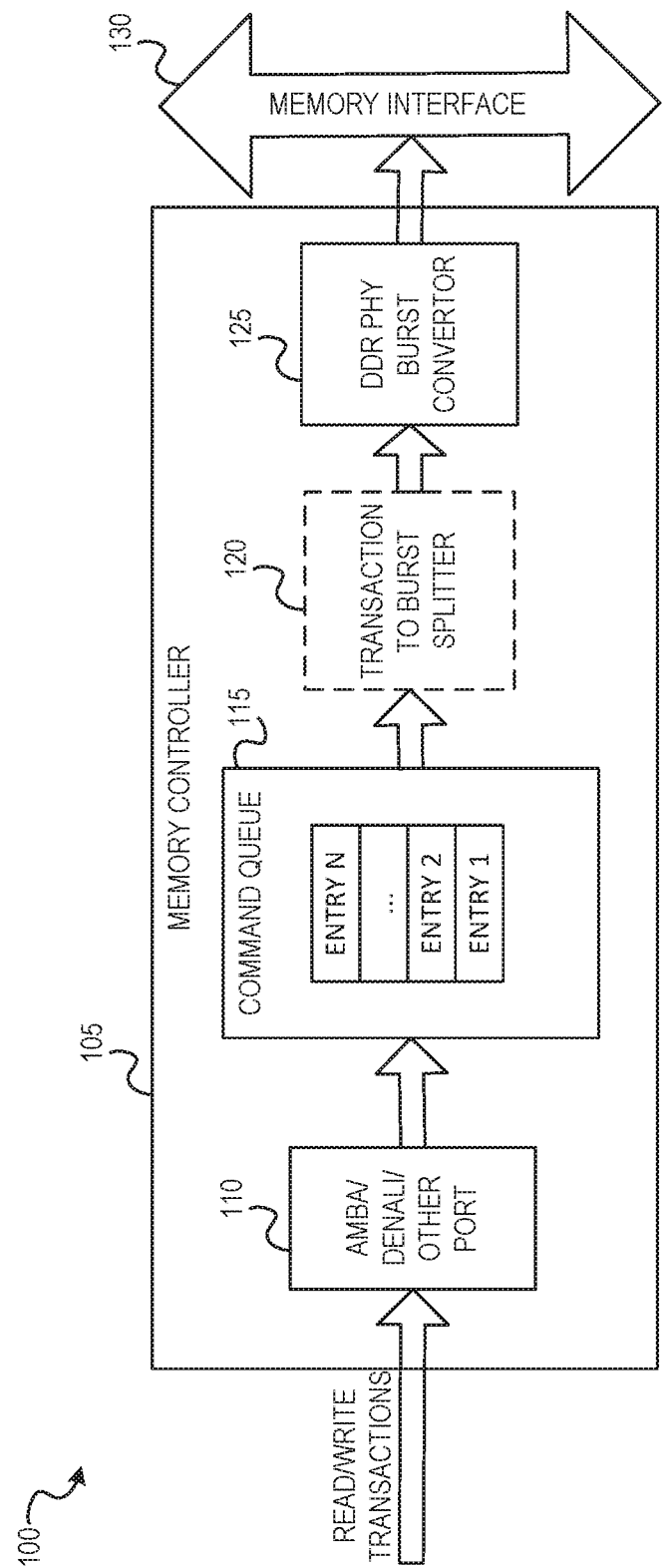
FIG. 1 is a block diagram illustrating a memory controller architecture, according to some embodiments.

FIG. 1 is a block diagram illustrating a memory controller architecture 100, according to some embodiments. A command queue 115 may be used in memory controllers for computer systems, such as high bandwidth memory (HBM) and dual data rate (DDR) synchronous dynamic random-access memory (SDRAM) controllers, of which memory controller 105 of FIG. 1 is representative. In order to efficiently utilize HBM/DDR bandwidth and efficiently process an outstanding number of memory transactions, the command queue 115 may accept transactions from an Advanced Microcontroller Bus Architecture (AMBA), Denali, or other port 110 to be scheduled, rearrange the schedule of the accepted transactions, store the scheduled transactions in queue entries 1-N within the command queue 115, select the stored transactions to be output according to specific rules, and transfer the output transactions to a DDR burst convertor 125. The DDR burst converter 125 may then split the transactions and convert the transactions to dynamic random-access memory (DRAM) bursts for transmission on a memory interface 130, which may include a DDR PHY interface (DFI) or other type of memory interface.

Each entry in the command queue 115 may store the content of a transaction, which may include a memory page number, a start address of the memory, a length of memory accessed, a memory burst type, and other information. The command queue 115 may use a placement algorithm to determine the order in which transactions are to be placed into the entries 1, . . . , N. The logic of the placement algorithm may follow many rules to determine where new transactions should be inserted into the command queue 115 relative to the existing contents of the entries 1, . . . , N at the time the new transactions are inserted in the interest of high efficiency of the memory controller 105.

Whenever a write burst is issued, corresponding write data stored in a write data queue may be popped out and sent to the memory interface 130 after a defined write latency. Whenever a read burst is used, valid read data may be available on the memory interface 130 after a programmed read latency. The read data path may gather the read data from the memory interface 130 and transfer the read data to a host data interface.

Figure 2:
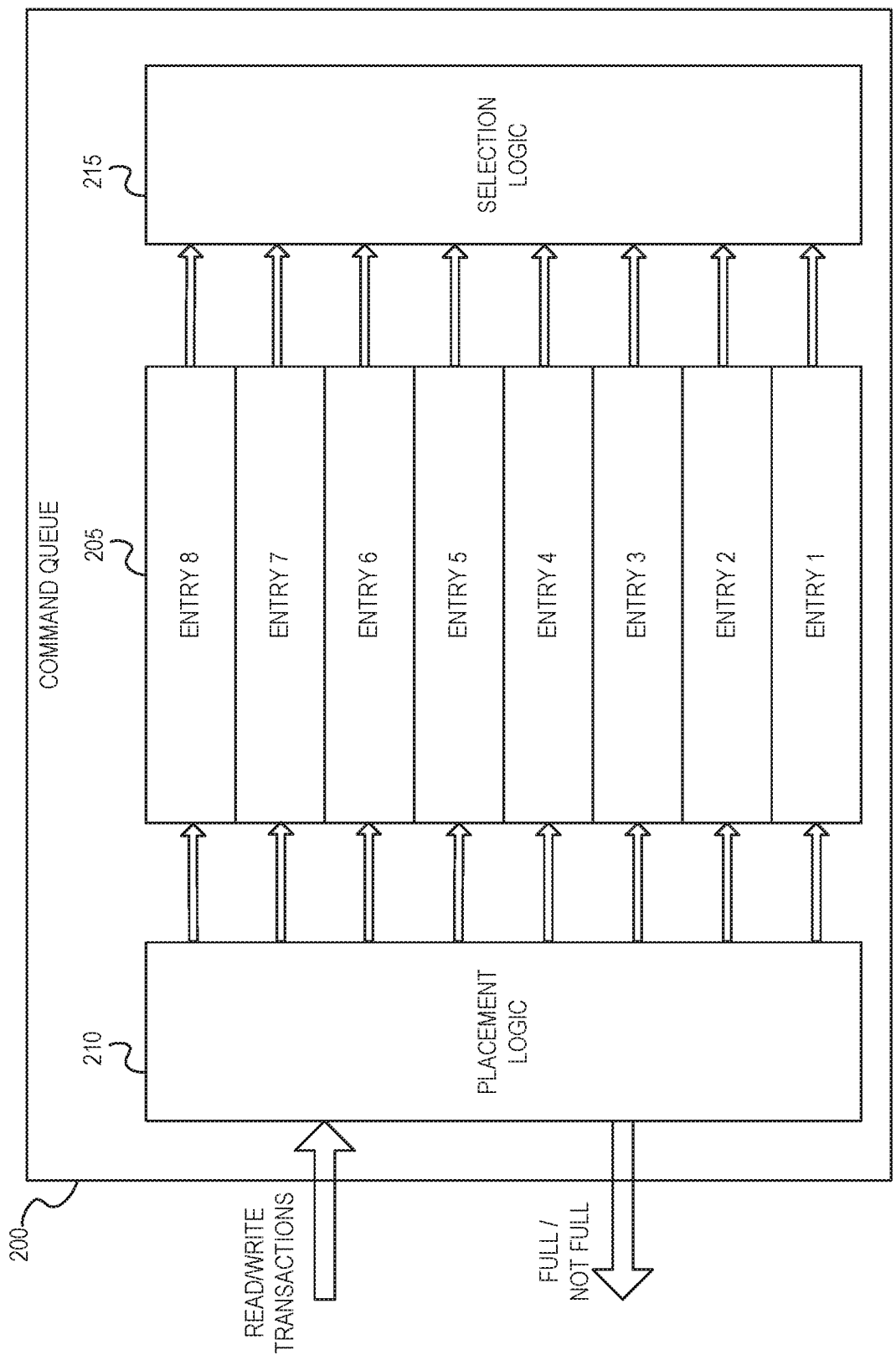
FIG. 2 is a block diagram representing a command queue, according to some embodiments.

FIG. 2 is a block diagram representing a command queue 200, according to some embodiments. The command queue 200 may be an embodiment of the command queue 115 of FIG. 1. The command queue 200 includes a plurality of queue entries 205 (eight are shown as an example), placement logic 210, and selection logic 215. The placement logic 210 may receive read/write transactions. The selection logic 215 may determine an order and a process of pulling memory transaction commands from the queue entries 205 for transmission to a memory interface and execution by memory devices of a computer system with which the command queue 200 is communicatively coupled.

Due to the limited amount of memory (e.g., depth) of a conventional command queue, a conventional memory controller exhibits low efficiency when processing a series of short memory transactions that access contiguous logical or physical memory addresses. Each of these short memory transactions occupies an entry of the conventional command queue, thereby reducing the number of additional memory transactions that can be stored in the conventional command queue. Compared to a single memory transaction having a long memory length that accesses the same total memory address range as a series of short memory transactions, the series of short memory transactions take up more space in the conventional command queue and reduce its efficiency. For example, if the host memory port bandwidth is greater than the bursts on the memory interface coupled with a conventional memory controller, a mass of short memory transactions may reduce the efficiency of the conventional memory controller, for example, by causing the conventional command queue to become full and not accept additional outstanding memory transactions for a period of time. As an illustration, in a conventional command queue having eight entries, after accepting eight short transactions, the conventional command queue becomes full and not able to accept additional read/write transactions. In a contrasting illustration, a single long transaction that covers a same total memory length as the eight short transactions illustrated above takes up less space in the conventional command queue, leaving room for additional read/write transactions to be stored.

To improve command queue efficiency when receiving numerous short memory transactions, the number of entries (or depth) of the command queue may be increased to accept more short and contiguous transactions. However, this approach has a significant cost. Furthermore, increasing the number of entries would increase the depth of the placement logic associated with the command queue, thereby restricting ASIC synthesis frequency for the command queue. To avoid these problems associated with increasing the depth of the command queue, embodiments described herein improve command queue efficiency by improving the efficiency of use of the command queue entries without expanding the depth of the command queue. Two approaches described below achieve the efficiency improvements of the embodiments.

In a first approach, a plurality of short transactions that have contiguous address ranges are merged together into a single larger transaction before being stored in an entry of the command queue. Each transaction includes a start address and an access length which are supplied to a host interface. An end address of the memory access is the sum of the start address and access length. This end address could be calculated by a memory controller. In an example, a software program or computer system may split a long range memory access into numerous (e.g., N) shorter transactions, with the shorter transactions having contiguous memory access ranges defined by their respective start addresses and memory access lengths. When these N shorter transactions are received by an embodiment of the command queue as described below, the command queue may merge the N shorter transactions into a single longer transaction having a start address which is the lowest value start address among the full set of N shorter transactions and a memory access length equal to the sum of memory access lengths of the full set of N shorter transactions. The single longer transaction then occupies only one entry in the command queue, leaving the N−1 other entries that would have otherwise been occupied by the received shorter transactions available to accept additional outstanding memory transactions.

In a second approach, a plurality of short transactions that access a same memory page (e.g., DRAM page) are merged together into a single compound memory transaction that occupies a single entry within an embodiment of the command queue. The plurality of short transactions may be combined even when they do not access a contiguous memory range. When accessing DRAM, for example, a DDR controller opens and closes various DRAM pages. Once a DRAM page has been opened by a memory transaction, if the following memory transaction accesses the same DRAM page, the DRAM page does not need to be opened again. In this second approach, the architecture of entries of the command queue embodiment is modified compared to traditional command queue entries. In particular, the command queue entries are structured to include a plurality of start addresses and access lengths associated with a single page number and associated common information including bank/row address, burst type, ID number, and page status.

The memory transactions that meet the criteria for the second approach may not meet the criteria for the first approach, and in that case may not be merged according to the first approach. When the plurality of short transactions meeting the criteria for the second approach are merged together into a single command queue entry in the command queue embodiment of the second approach, less memory space is occupied by the merged command queue entry than would be taken up by the plurality of short transactions in the traditional command queue. Furthermore, embodiments of a command queue according to the second approach require less memory and associated circuitry and consequently less integrated circuit area than increasing the depth of the traditional command queue would, thereby decreasing cost and improving efficiency. The number of pairs of memory start addresses and memory access lengths within a single entry of the command queue may be configurable. As the number of pairs of memory start addresses and memory access lengths within a command queue entry is increased, a number of memory transactions that access a same memory page that can be merged into a single command queue entry increases; however, at the same time, a total number of entries within the command queue also decreases given a fixed total amount of memory for the command queue entries. A tradeoff between the total number of command queue entries in the command queue and the number of pairs of memory start addresses and memory access lengths within each command queue entry may be optimized according to an application in order to improve overall memory access efficiency.

Figure 3:
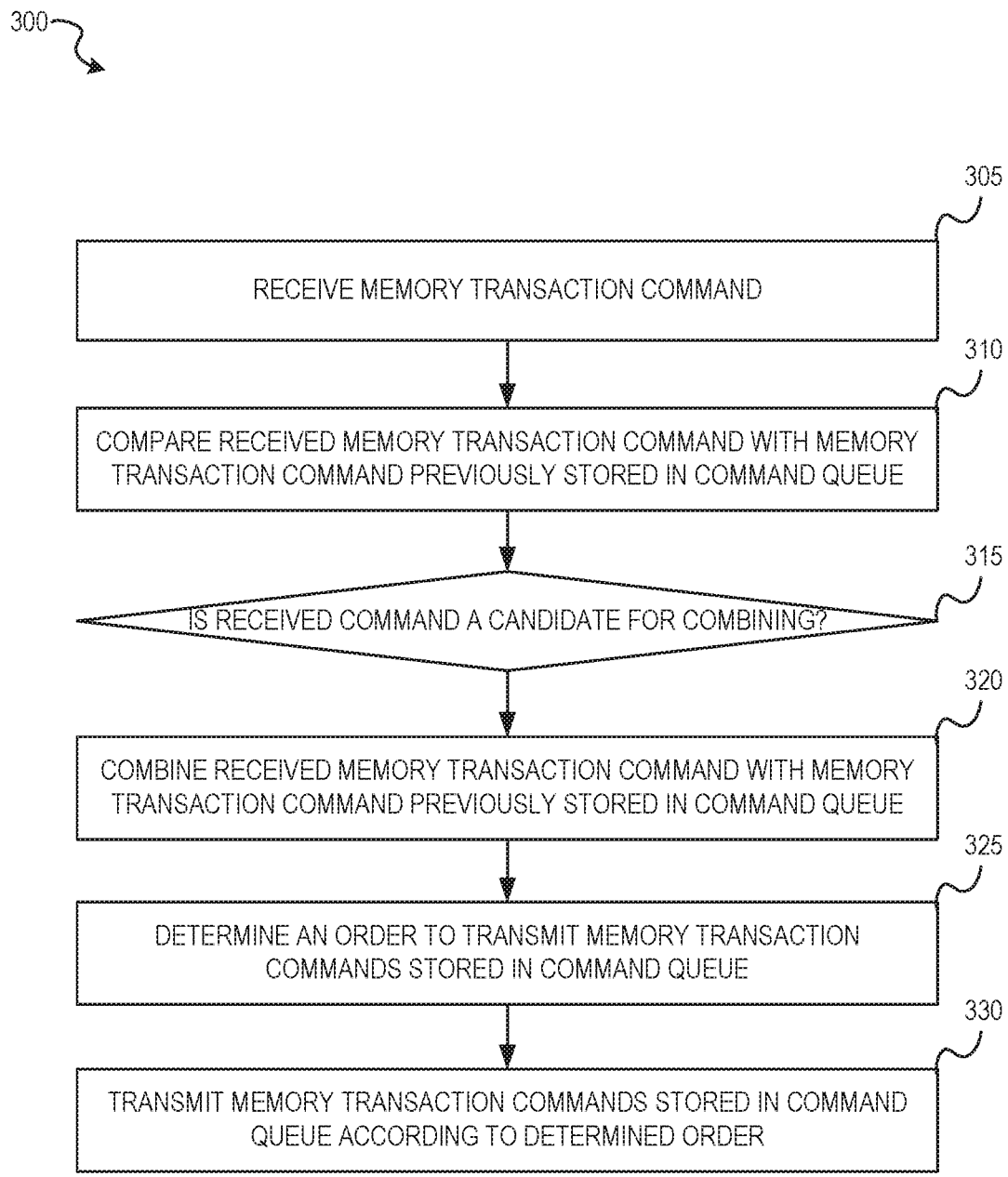
FIG. 3 is a flow chart illustrating a method for controlling computer memory including merging entries of a command queue, according to some example embodiments.

FIG. 3 is a flow chart illustrating a method 300 for controlling computer memory including merging entries of a command queue, according to some example embodiments. Method 300 may be performed using embodiments of a memory controller including a command queue as disclosed herein, for example, computer memory controller 400.

In an operation 305, a memory transaction command may be received from a data port by one or more hardware processors. The one or more hardware processors may include an application specific integrated circuit (ASIC), a programmable logic device (PLD), a field programmable gate array (FPGA), a custom integrated circuit, or other type of electronic circuit as known in the art. For example, the one or more hardware processors may include a memory controller. The data port may be communicatively coupled with a memory or data bus via which the memory transaction command is received from another hardware processor, for example, within a computer system. The memory transaction command may be an executable instruction for the performance of an operation involving one or more memory addresses, e.g., writing data to a memory device or reading data from a memory device.

In an operation 310, the received memory transaction may be compared with a memory transaction command previously stored in one of a plurality of memory entries of a command queue. The comparison may be made by one or more hardware processors, e.g., a memory controller or other hardware processor as disclosed elsewhere herein. The one or more hardware processors may compare the received memory transaction command with each memory transaction command previously stored in the memory entries of the command queue.

In an operation 315, one or more hardware processors may determine whether the received memory transaction command is a candidate for combining with the memory transaction command previously stored in the command queue. The one or more hardware processors may include a memory controller or other hardware processor as disclosed elsewhere herein. The determination may be made according to a result of the comparison performed in operation 310. The one or more hardware processors may determine whether the received memory transaction command is a candidate for combining with each of the plurality of memory transaction commands previously stored in the memory entries of the command queue.

For example, the determination may be made according to at least one matching condition, e.g., contiguous memory ranges, or accessing a same memory page. In various embodiments, the received memory transaction may be determined to be a candidate for combining with the previously stored memory transaction command according to a further matching condition. For example, the compared memory transaction commands may be determined to have one or more of matching command types and/or matching ID's. In addition, the compared memory transaction commands may be determined to not have any priority collisions.

The matching condition may be determined to be met when the received memory transaction command and the previously stored memory transaction command access contiguous memory ranges. Thus, when the received memory transaction command accesses a memory range that is contiguous with a memory range accessed by the memory transaction command previously stored in the command queue, the hardware processor may determine that the received memory transaction is a candidate for combining with the memory transaction command previously stored in the command queue with which it was compared in operation 310.

Likewise, the matching condition may be determined to be met when the received memory transaction command and the previously stored memory transaction command access a same memory page. Thus, when the contiguous memory range matching condition is not met but the received memory transaction command accesses a same memory page as the memory transaction command previously stored in the command queue, the hardware processor may determine that the received memory transaction is a candidate for combining with the memory transaction command previously stored in the command queue with which it was compared in operation 310.

In an operation 320, when the received memory transaction command is determined to be a candidate for combining, one or more hardware processors may combine the received memory transaction with the previously stored memory transaction command. The one or more hardware processors may include a memory controller or other hardware processor as disclosed elsewhere herein.

Under the contiguous memory range matching condition, combining the received memory transaction command with the previously stored memory transaction command may include configuring the combined memory transaction command to access the contiguous memory ranges of both the received memory transaction command and the previously stored memory transaction command.

Under the accessing a same memory page matching condition, combining the received memory transaction command with the previously stored memory transaction command may include storing a memory page start address and associated length for the received memory transaction command in the same memory entry of the command queue as the previously stored memory transaction command in addition to the previously stored memory page start address and associated length of the previously stored memory transaction command. In various embodiments, the memory entry of the command queue includes a plurality of subentries to store different memory page start addresses and associated memory access lengths. Each of the different memory page start addresses and associated memory access lengths may correspond to different received memory transaction commands that access a same memory page. The memory entry of the command queue may also include a subentry to store a single copy of other information associated with all of the subentries that store different memory page start addresses and associated lengths. This other information may include bank/row address, burst type, ID number, and page status. The memory controller may compute a memory page end address by summing the memory page start address and the associated length data.

In an operation 325, one or more hardware processors may determine an order to transmit the memory transaction commands stored in the plurality of memory entries of the command queue. The one or more hardware processors may include a memory controller or other hardware processor as disclosed elsewhere herein. The order may be determined according to various rules to improve overall memory access efficiency.

In an operation 330, one or more hardware processors may transmit the combined memory transaction command from the command queue to the memory interface according to the order determined in operation 325. The combined memory transaction command may be transmitted by the memory controller via a memory bus to one or more memory devices, e.g., DRAM devices, via the memory interface. Transmitting the combined memory transaction command may include transmitting a separate memory transaction command for each of the plurality of subentries that store different memory page start addresses and associated lengths for the combined memory transaction command when the accessing a same memory page matching condition is met. Thus, the memory devices may receive the same memory transaction commands in the embodiments described herein based on the accessing a same memory page matching condition as when receiving memory commands from a traditional memory controller, because the embodiments may store the memory transaction commands more efficiently without substantively changing the underlying memory transaction commands to be issued to the memory devices.

Figure 4:
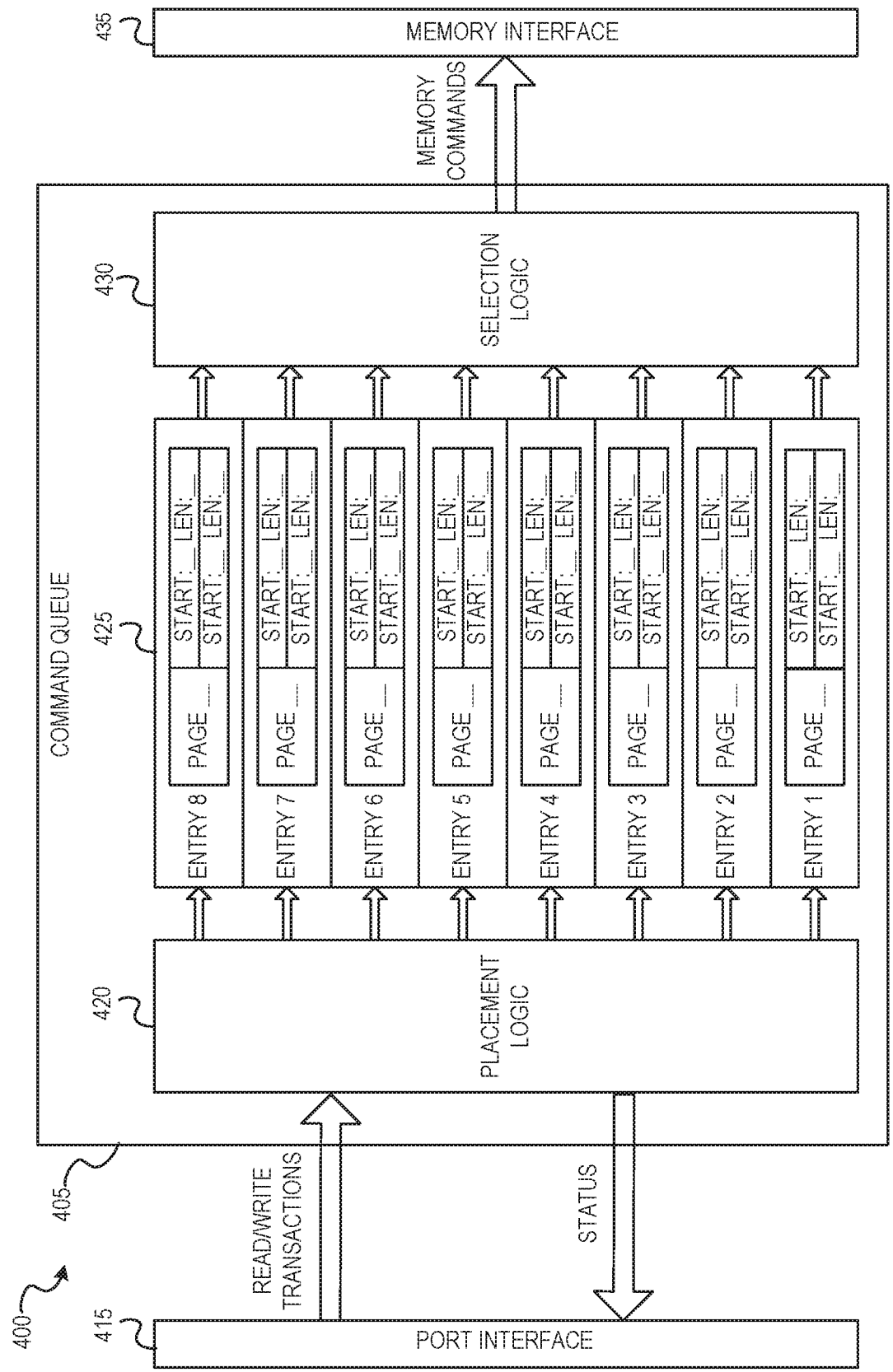
FIG. 4 is a block diagram illustrating a memory controller having a command queue with an entries merging capability, according to some example embodiments.

FIG. 4 is a block diagram illustrating a memory controller 400 having a command queue 405 with an entries merging capability, according to some example embodiments. The memory controller 400 includes the command queue 405, a port interface 415 that interfaces the command queue 405 with a computing processor of a computer system, and a memory interface 435 that interfaces the command queue 405 with one or more memory devices, e.g., via a data bus. The command queue 405 includes three main parts: placement logic 420, queue entries 425, and selection logic 430. The command queue 405 may include an embodiment of the command queue 115 and/or 200.

Each of the queue entries 425 may store memory transaction commands and associated information. The queue entries 425 include a plurality of entries within a memory circuitry region. While eight entries are illustrated, this should not be construed as limiting, as in various embodiments, the number of entries may be different. In some embodiments, the number of queue entries 425 in the command queue 405 may be configurable by changing the amount of subentries and associated memory space allocated to each entry. As illustrated, each entry 1-8 within the queue entries 425 includes a page number (PAGE), and a plurality of pairs of start addresses (START) and memory access lengths (LEN). In some embodiments in which the second approach to merging memory transaction commands is not implemented, there may only be one pair of start addresses and memory access lengths per entry. In addition to the illustrated subentries, each of the queue entries 425 may also include other information, for example, bank/row address, burst type, ID number, and page status (not illustrated). These additional items of other information may be common and shared among all START and LEN pairs associated with a common PAGE number within an entry.

The placement logic 420 may determine where newly received memory transaction commands (e.g., read/write transactions received from the port interface 415) should be inserted within the queue entries 425. The placement logic 420 may determine the placement of the new memory transaction commands by considering address collisions, source ID collisions, data collisions, command types, and priorities. The placement logic 420 also may execute the memory transaction command merging strategies and operations discussed above with reference to FIG. 3. Each new incoming memory transaction command may be compared to the previously received memory transaction commands stored within the queue entries 425. If the new incoming memory transaction command is found to meet a matching condition when compared to one of the previously received memory transaction commands with which it is compared, the placement logic 420 may not insert the new incoming memory transaction command into the queue entries 425, but instead may update the matching previously stored memory transaction command to reflect the combination of both the new incoming memory transaction command and the matching previously stored memory transaction command. The matching condition may be determined to be met when the compared memory transaction commands have contiguous memory ranges within a same page, or they at least access a same memory page, and also have a same memory command type and a same ID and do not have a priority collision.

When the matching condition is determined to be that the compared memory transaction commands access contiguous memory ranges, the placement logic 420 may update the START and/or LEN entries of the matching previously stored memory transaction command to make the modified memory transaction command cover the combined memory range of both the new incoming memory transaction command and the matching previously stored memory transaction command.

When the matching condition is determined to be that the compared memory transaction commands access a same memory page, a new START and LEN entry corresponding to the new incoming memory transaction command may be added to the entry of the matching previously stored memory transaction command. The new START and LEN entry may only be added when there are free START and LEN pairs available within the entry. Otherwise, the matching condition may be determined to not be met, and the new incoming memory transaction command may be inserted into the queue entries 425 unless a match is made with another previously stored memory transaction command.

The selection logic 430 may determine an order and a process of pulling memory transaction commands from the queue entries 425 for transmission to the memory interface 435 and execution by the memory devices of the computer system with which the memory controller 400 is communicatively coupled. Only one memory transaction command may be pulled from the queue entries 425 at a time.

FIGS. 5A-5D are block diagrams representing states of a command queue 505 at different stages of the method illustrated in FIG. 3, according to some sample embodiments. The command queue 505 may include an embodiment of the command queue 115, 200, and/or 405. Values for PAGE, START, and LEN in the queue entries 525 that are annotated "***" indicate that a value is present, but its precise value is not important for the purposes of the illustrated example, and is therefore omitted for clarity.

Figure 5A:
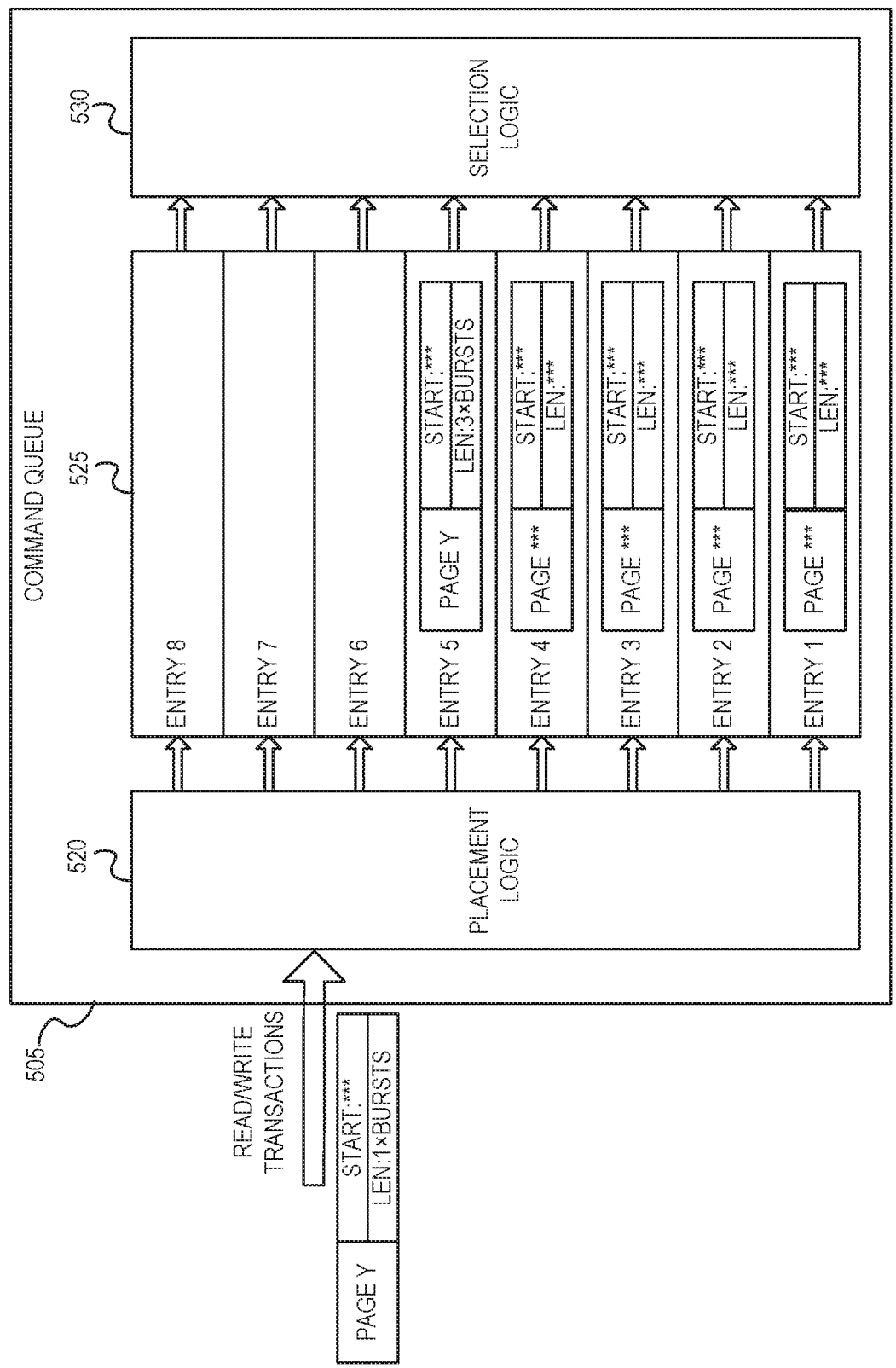
FIGS. 5A-5D are block diagrams representing states of a command queue at different stages of the method illustrated in FIG. 3, according to some sample embodiments.

As illustrated in FIG. 5A, the command queue 505 has five existing entries in the queue entries 525, the most recent of which is a memory transaction command acting on memory page Y with a length of 3 bursts. As also illustrated, a new memory transaction command also acting on memory page Y and having a length of 1 burst is received by the command queue 505. In the illustrated example, the new memory transaction command operates on memory that is contiguous with the memory transaction command of entry 5 of the queue entries 525.

Figure 5B:
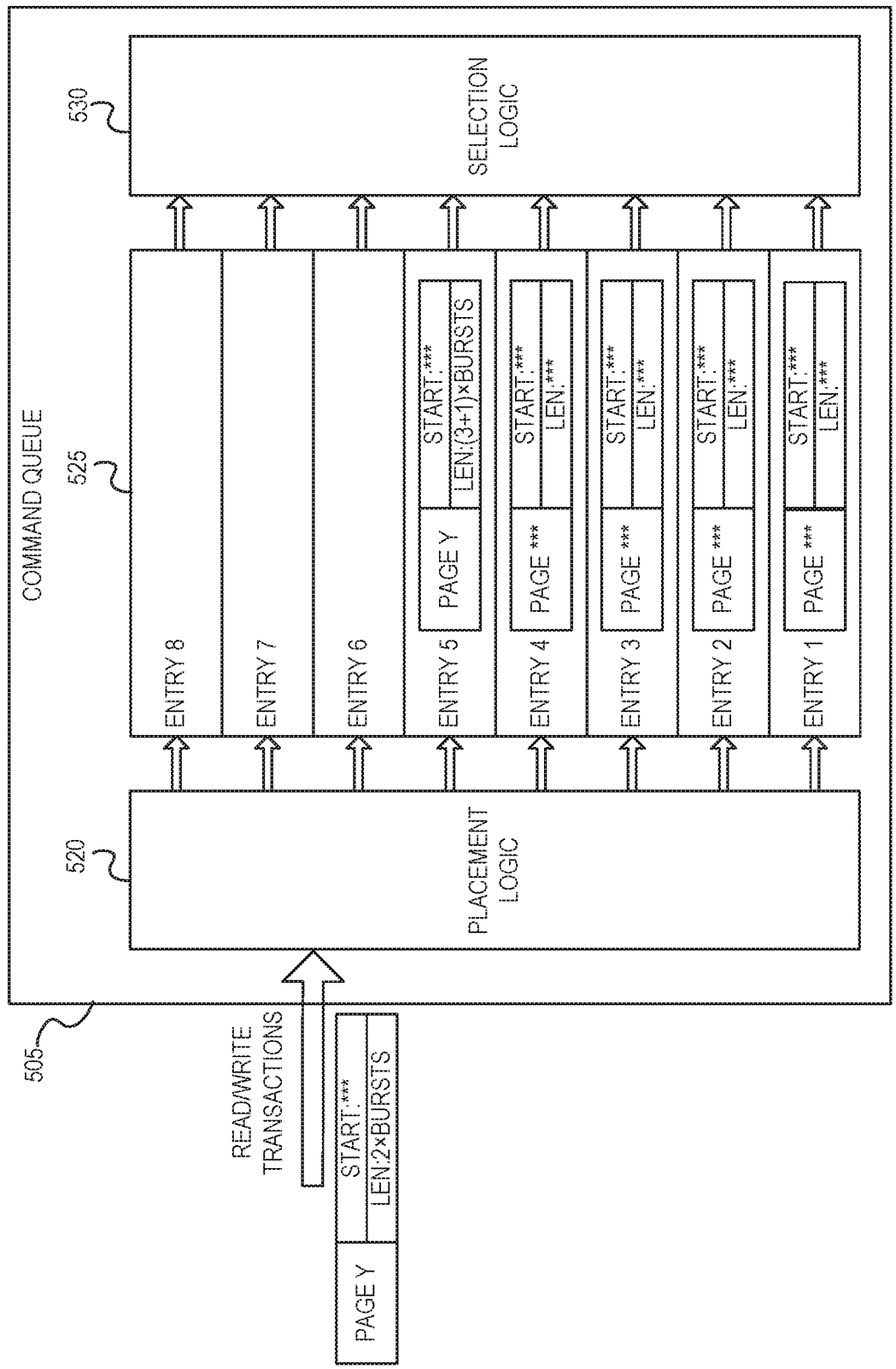

As illustrated in FIG. 5B, the placement logic 520 combines the new memory transaction command received in FIG. 5A with the memory transaction command already existing in entry 5 of the queue entries 525 by adding the new LEN value of 1 burst to the previously existing LEN value of 3 bursts to arrive at a total LEN value of 4, because the new memory transaction command received in FIG. 5A operates on memory that is contiguous with the memory operated on by the already existing in entry 5 of the queue entries 525. The START value of entry 5 of the queue entries 525 may be updated if the START value of the new memory transaction command is lower than the START value of entry 5 of the queue entries 525. Also as illustrated in FIG. 5B, a new memory transaction command also acting on memory page Y and having a length of 2 bursts is received by the command queue 505. In the illustrated example, this new memory transaction command also operates on memory that is contiguous with the memory transaction command of entry 5 of the queue entries 525.

Figure 5C:
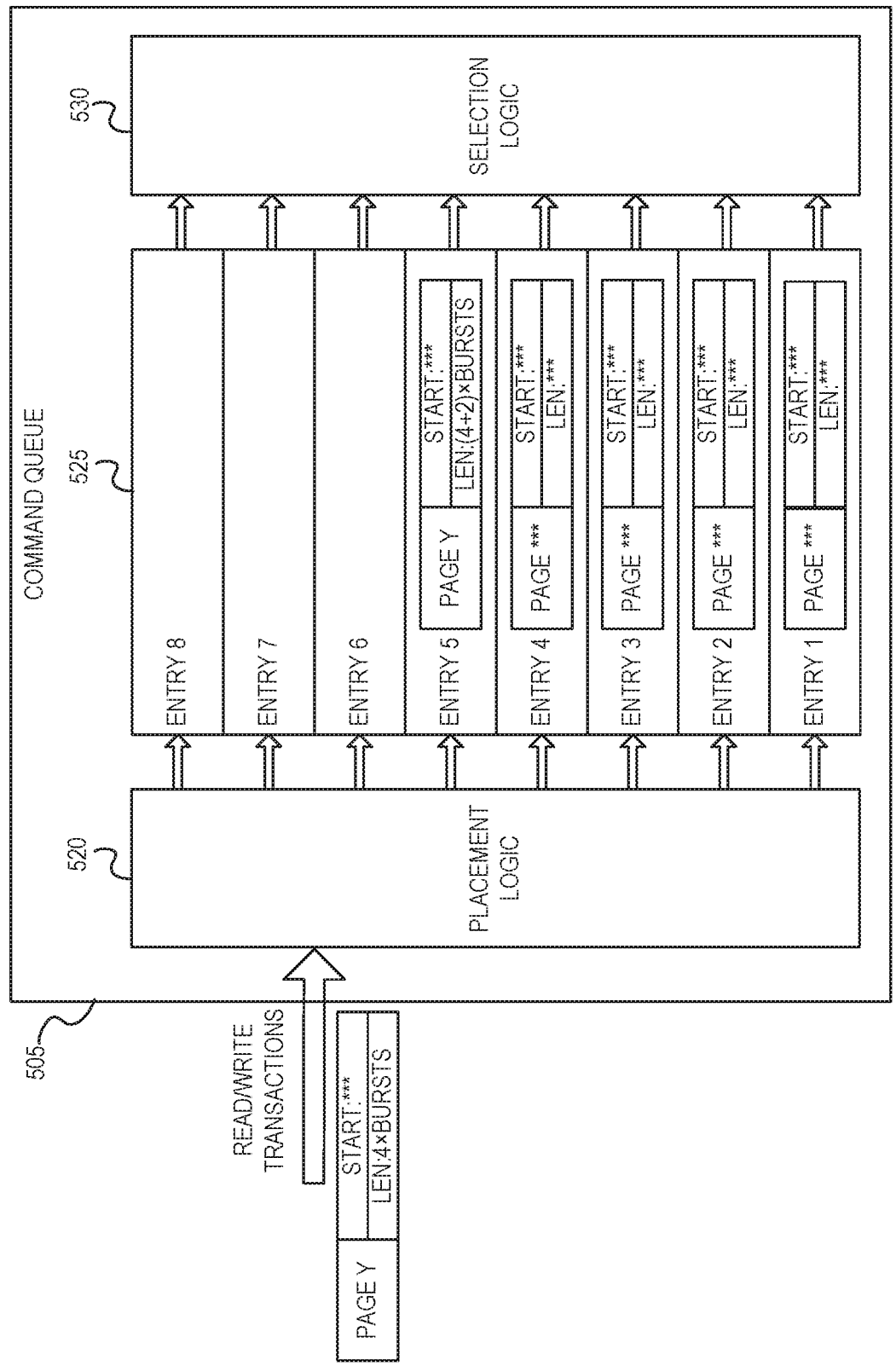

As illustrated in FIG. 5C, the placement logic 520 combines the new memory transaction command received in FIG. 5B with the memory transaction command already existing in entry 5 of the queue entries 525 by adding the new LEN value of 2 bursts to the previously existing LEN value of 4 bursts to arrive at a total LEN value of 6, because the new memory transaction command received in FIG. 5B operates on memory that is contiguous with the memory operated on by the already existing in entry 5 of the queue entries 525. The START value of entry 5 of the queue entries 525 may be updated if the START value of the new memory transaction command is lower than the START value of entry 5 of the queue entries 525. Also as illustrated in FIG. 5C, a new memory transaction command also acting on memory page Y and having a length of 4 bursts is received by the command queue 505. In the illustrated example, this new memory transaction command also operates on memory that is contiguous with the memory transaction command of entry 5 of the queue entries 525.

Figure 5D:
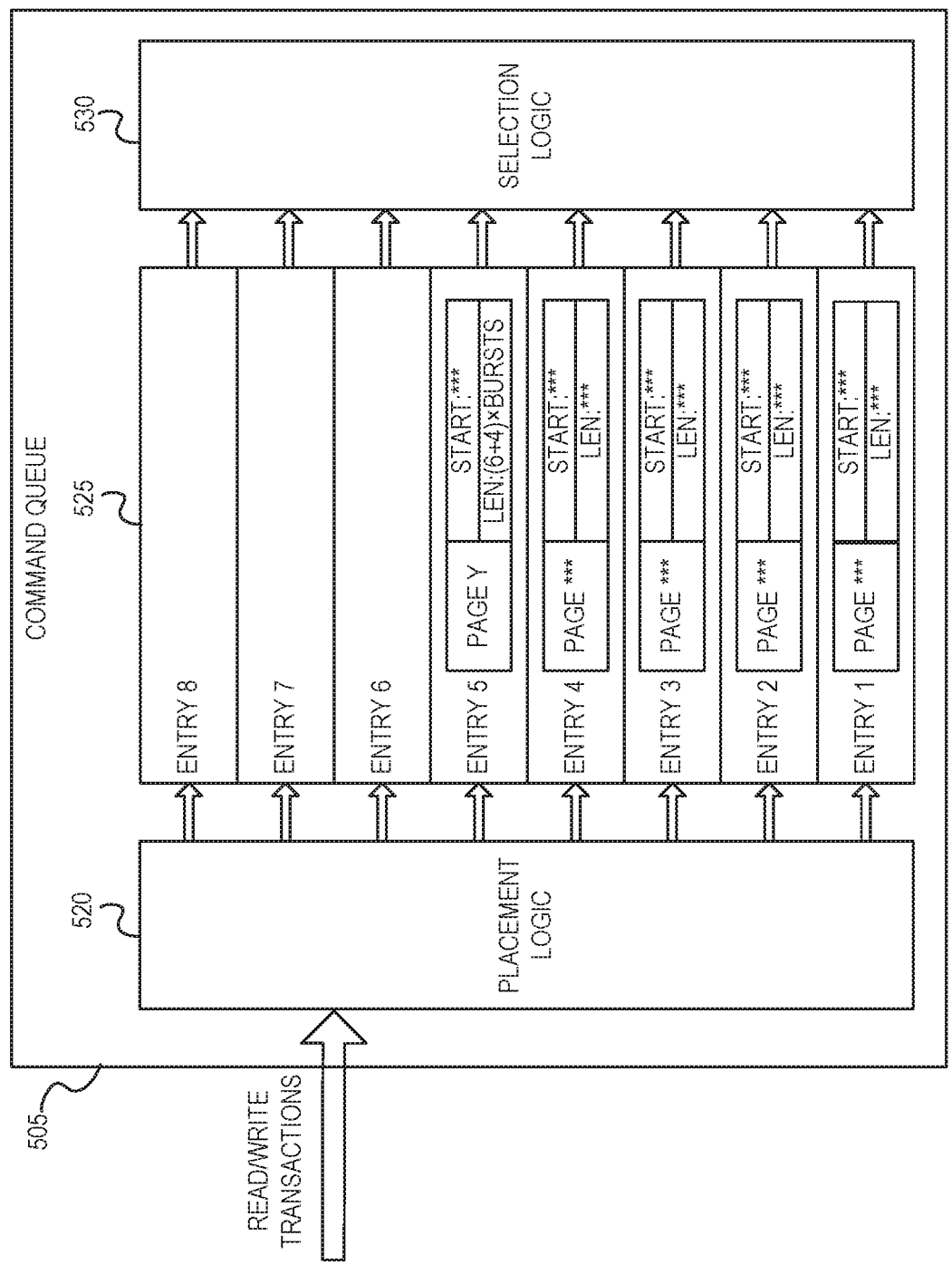

As illustrated in FIG. 5D, the placement logic 520 combines the new memory transaction command received in FIG. 5C with the memory transaction command already existing in entry 5 of the queue entries 525 by adding the new LEN value of 4 bursts to the previously existing LEN value of 6 bursts to arrive at a total LEN value of 10, because the new memory transaction command received in FIG. 5C operates on memory that is contiguous with the memory operated on by the already existing in entry 5 of the queue entries 525. The START value of entry 5 of the queue entries 525 may be updated if the START value of the new memory transaction command is lower than the START value of entry 5 of the queue entries 525.

Figure 6A:
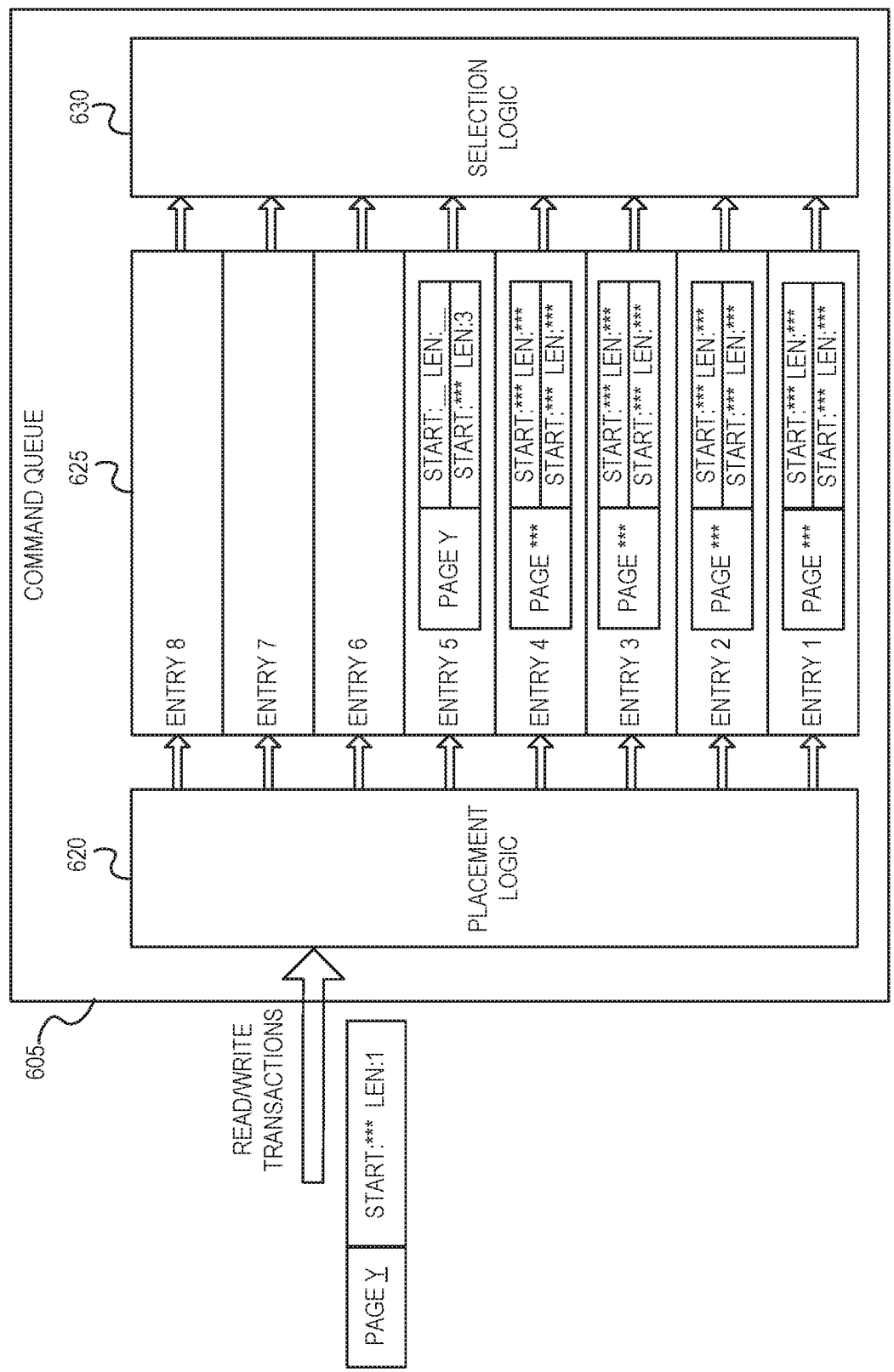
FIGS. 6A-6B are block diagrams representing states of a command queue at different stages of the method illustrated in FIG. 3, according to some sample embodiments.
Figure 6B:
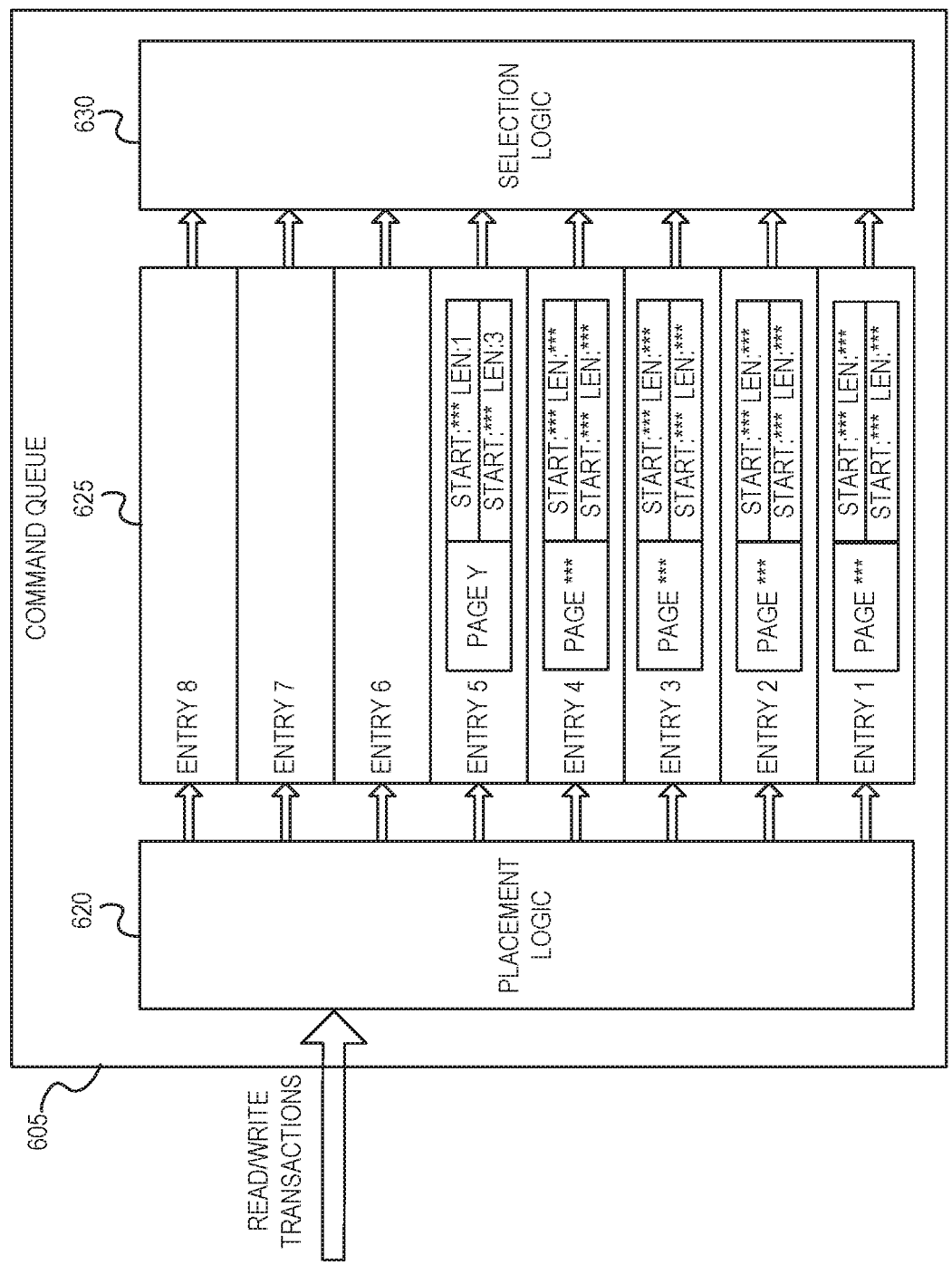

FIGS. 6A-6B are block diagrams representing states of a command queue at different stages of the method illustrated in FIG. 3, according to some sample embodiments. The command queue 605 may include an embodiment of the command queue 115, 200, 405, and/or 505. Values for PAGE, START, and LEN in the queue entries 625 that are annotated "***" indicate that a value is present, but its precise value is not important for the purposes of the illustrated example, and is therefore omitted for clarity.

As illustrated in FIG. 6A, the command queue 605 has five existing entries in the queue entries 625, the most recent of which is a memory transaction command acting on memory page Y with a length of 3 bursts. As also illustrated, a new memory transaction command also acting on memory page Y and having a length of 1 burst is received by the command queue 605. In the illustrated example, the new memory transaction command does not operate on memory that is contiguous with the memory transaction command of entry 5 of the queue entries 525.

As illustrated in FIG. 6B, the placement logic 620 combines the new memory transaction command received in FIG. 6A with the memory transaction command already existing in one subentry in entry 5 of the queue entries 625 by adding the new memory transaction into a separate subentry in entry 5 of the queue entries 625. After the combination, entry 5 of the queue entries 625 includes two memory transaction commands for memory page Y that do not operate on contiguous memory: one having a LEN value of 1 burst in one subentry and a second having a LEN value of 3 bursts in a second subentry, because the new memory transaction command received in FIG. 6A operates on memory that is not contiguous with the memory operated on by the already existing memory transaction command in entry 5 of the queue entries 525, but does operate on memory within the same memory page.

Figure 7:
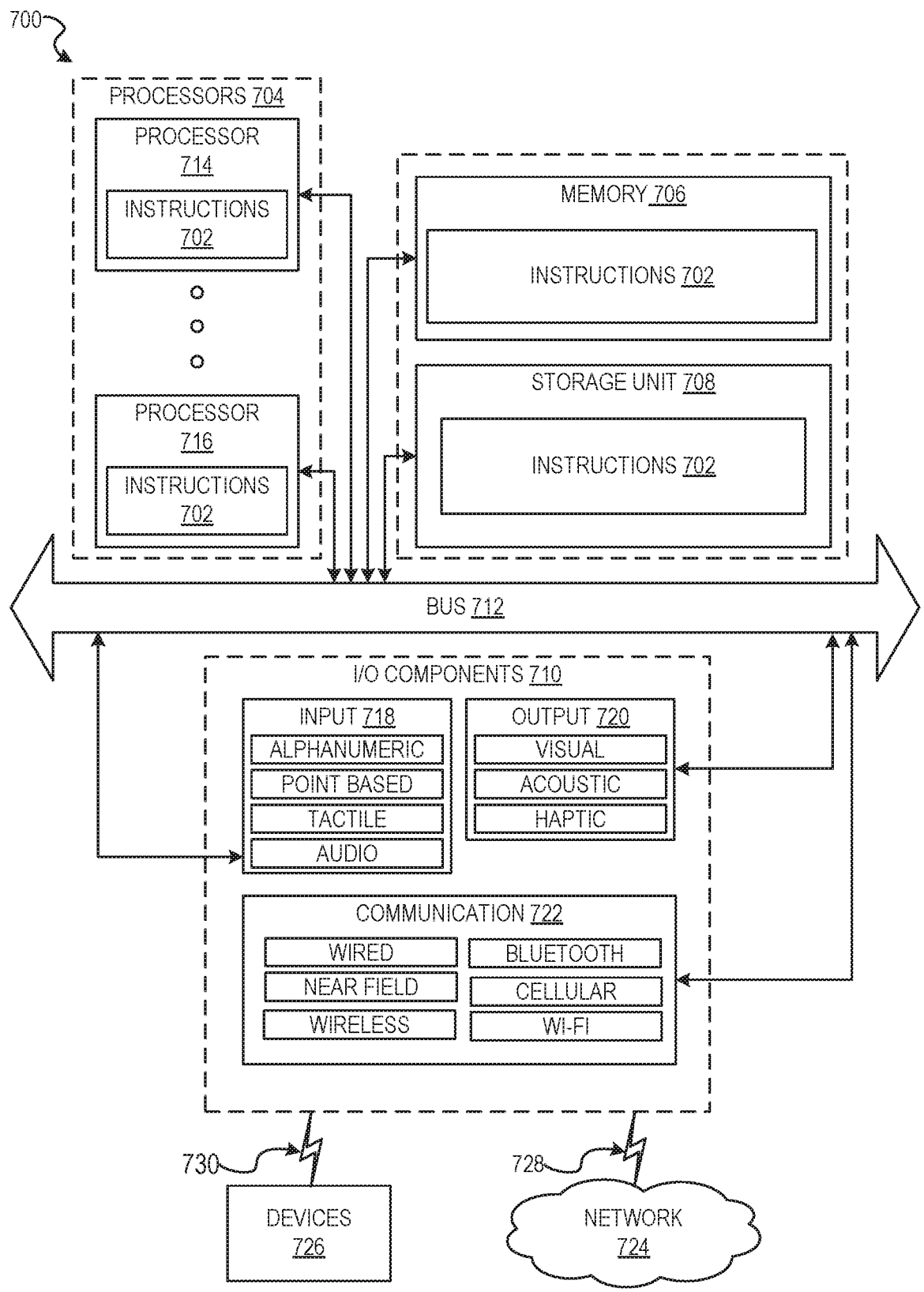
FIG. 7 is a block diagram illustrating components of a machine, according to some example embodiments, able to read instructions from a machine-readable medium (e.g., a machine-readable storage medium) and perform any one or more of the methodologies discussed herein.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a system, within which instructions 702 (e.g., software, a program, an application, an applet, an app, a driver, or other executable code) for causing the machine 700 to perform any one or more of the methodologies discussed herein may be executed. For example, the instructions 702 include executable code that causes the machine 700 to execute the method 300. In this way, these instructions 702 transform the general, non-programmed machine 700 into a particular machine programmed to carry out the described and illustrated method 300 in the manner described herein. The machine 700 may operate as a standalone device or may be coupled (e.g., networked) to other machines.

By way of non-limiting example, the machine 700 may comprise or correspond to a television, a computer (e.g., a server computer, a client computer, a personal computer (PC), a tablet computer, a laptop computer, or a netbook), a set-top box (STB), a personal digital assistant (PDA), an entertainment media system (e.g., an audio/video receiver), a cellular telephone, a smart phone, a mobile device, a wearable device (e.g., a smart watch), a portable media player, or any machine capable of executing the instructions 702, sequentially or otherwise, that specify actions to be taken by the machine 700. Further, while only a single machine 700 is illustrated, the term "machine" shall also be taken to include a collection of machines 700 that individually or jointly execute the instructions 702 to perform any one or more of the methodologies discussed herein.

The machine 700 may include processors 704, memory 706, a storage unit 708, and I/O components 710, which may be configured to communicate with each other such as via a bus 712. In an example embodiment, the processors 704 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 714 and a processor 716 that may execute the instructions 702. The term "processor" is intended to include multi-core processors 704 that may comprise two or more independent processors (sometimes referred to as "cores") that may execute instructions contemporaneously. Although FIG. 7 shows multiple processors, the machine 700 may include a single processor with a single core, a single processor with multiple cores (e.g., a multi-core processor), multiple processors with a single core, multiple processors with multiple cores, or any combination thereof.

The memory 706 (e.g., a main memory or other memory storage) and the storage unit 708 are both accessible to the processors 704 such as via the bus 712. The memory 706 and the storage unit 708 store the instructions 702 embodying any one or more of the methodologies or functions described herein. The instructions 702 may also reside, completely or partially, within the memory 706, within the storage unit 708, within at least one of the processors 704 (e.g., within the processor's cache memory), or any suitable combination thereof, during execution thereof by the machine 700. Accordingly, the memory 706, the storage unit 708, and the memory of the processors 704 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 702. The term "machine-readable medium" shall also be taken to include any medium, or combination of multiple media, that is capable of storing instructions (e.g., instructions 702) for execution by a machine (e.g., machine 700), such that the instructions, when executed by one or more processors of the machine (e.g., processors 704), cause the machine to perform any one or more of the methodologies described herein (e.g., method 400). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 710 may include a wide variety of components to receive input, provide output, produce output, transmit information, exchange information, capture measurements, and so on. The specific I/O components 710 that are included in a particular machine 700 will depend on the type of the machine 700. For example, portable machines such as mobile phones will likely include a touch input device or other such input mechanisms, while a headless server machine will likely not include such a touch input device. It will be appreciated that the I/O components 710 may include many other components that are not specifically shown in FIG. 7. The I/O components 710 are grouped according to functionality merely for simplifying the following discussion and the grouping is in no way limiting. In various example embodiments, the I/O components 710 may include input components 718 and output components 720. The input components 718 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components, and the like. The output components 720 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 710 may include communication components 722 operable to couple the machine 700 to a network 724 or devices 726 via a coupling 728 and a coupling 730 respectively. For example, the communication components 722 may include a network interface component or another suitable device to interface with the network 724. In further examples, the communication components 722 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 726 may be another machine or any of a wide variety of peripheral devices.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network 724 (e.g., the Internet) and via one or more appropriate interfaces (e.g., APIs).

Electronic Apparatus and System

Example embodiments may be implemented in digital electronic circuitry, in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice.

Figure 8:
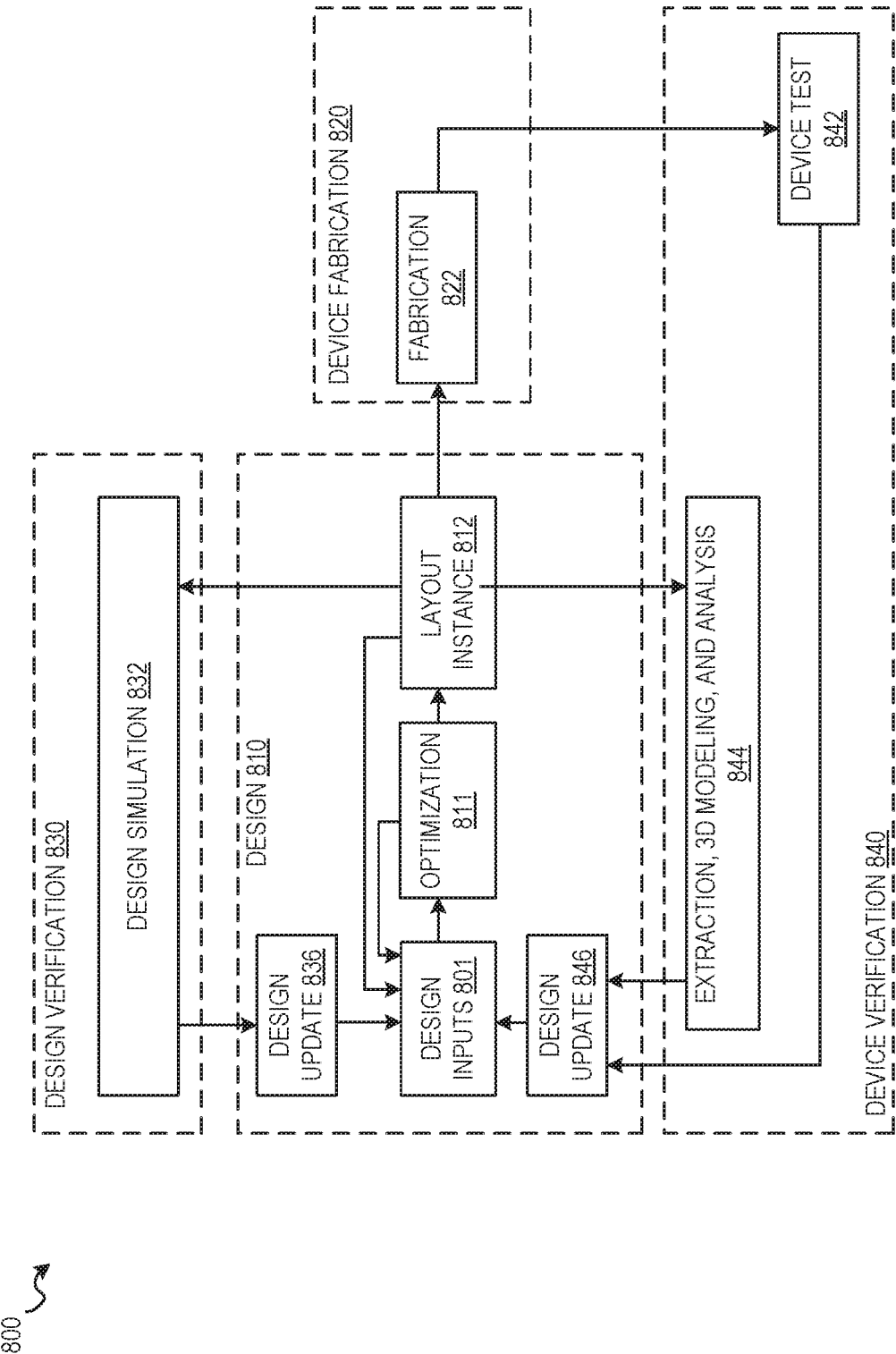
FIG. 8 is a diagram illustrating one possible design process flow for generating a circuit, including embodiments to implement partitioned root search for error locator polynomial functions in Reed-Solomon forward error correction (RS FEC) decoding, and in various embodiments, to integrate with a larger integrated circuit comprising different design blocks.

FIG. 8 is a diagram illustrating one possible design process flow for generating a circuit, including embodiments to implement a partitioned root search for error locator polynomial functions in Reed-Solomon forward error correction (RS FEC) decoding, and in various embodiments, to integrate with a larger integrated circuit comprising different design blocks. As illustrated, the overall design flow 800 includes a design phase 810, a device fabrication phase 820, a design verification phase 830, and a device verification phase 840. The design phase 810 involves an initial design input operation 801 where the basic elements and functionality of a device are determined, as well as revisions based on various analyses and optimization of a circuit design. This design input operation 801 is where instances of an EDA circuit design file are used in the design and any additional circuitry is selected. The initial strategy, tactics, and context for the device to be created are also generated in the design input operation 801, depending on the particular design algorithm to be used.

In some embodiments, following an initial selection of design values in the design input operation 801, timing analysis and optimization according to various embodiments occurs in an optimization operation 811, along with any other automated design processes. One such process may be the automated design of a partitioned root search for error locator polynomial functions in RS FEC decoding. As described below, design constraints for blocks of a circuit design generated with design inputs in the design input operation 801 may be analyzed using hierarchical timing analysis, according to various embodiments. While the design flow 800 shows such optimization occurring prior to a layout instance 812, such hierarchical timing analysis and optimization may be performed at any time to verify operation of a circuit design. For example, in various embodiments, constraints for blocks in a circuit design may be generated prior to routing of connections in the circuit design, after routing, during register transfer level (RTL) operations, or as part of a final signoff optimization or verification prior to a device fabrication operation 822.

After design inputs are used in the design input operation 801 to generate a circuit layout, and any optimization operations 811 are performed, a layout is generated in the layout instance 812. The layout describes the physical layout dimensions of the device that match the design inputs. This layout may then be used in the device fabrication operation 822 to generate a device, or additional testing and design updates may be performed using designer inputs or automated updates based on design simulation 832 operations or extraction, 3D modeling and analysis 844 operations. Once the device is generated, the device can be tested as part of device test 842 operations, and layout modifications generated based on actual device performance.

As described in more detail below, design updates 836 from the design simulation 832, design updates 846 from the device test 842 or the 3D modeling and analysis 844 operations, or the design input operation 801 may occur after an initial layout instance 812 is generated. In various embodiments, whenever design inputs are used to update or change an aspect of a circuit design, a timing analysis and optimization operation 811 may be performed.

For example, in various embodiments, a user may provide an input to a computing device indicating placement of elements of a circuit within a first portion of a circuit design, including description of circuitry for a partitioned root search for error locator polynomial functions in RS FEC decoding. An output to a display of the computing device may show details of a circuit design, and may further be used to generate results of the timing analysis, or may show recommended optimizations or automatically performed adjustments to the circuit design based on the timing analysis. Further inputs to the computing device may involve adjustments as user design inputs, with additional timing analysis and optimization initiated via user operation of the computing device. In some embodiments, a computing device may be used to generate circuit design files describing circuitry corresponding to embodiments described herein. Such circuit design files may be used as outputs to generate photolithographic masks or other control files and components used to generate circuits that operate in accordance with various embodiments described herein.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document, for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A computer memory controller apparatus comprising:
   a port interface coupled with a data bus to receive memory transaction commands;
   a command queue coupled with the port interface, the command queue including:
   a plurality of memory entries to store memory transaction commands, each memory entry including a plurality of subentries to store different memory page start addresses and associated lengths, each memory entry further including an additional subentry to store a single copy of other information associated with all of the plurality of subentries that store different memory page start addresses and associated lengths, and the other information including at least one of bank address, row address, a burst type, or a page status;
   a placement logic module to combine a received memory transaction command with a memory transaction command previously stored in one of the plurality of memory entries of the command queue, the combined memory transaction command shares the single copy of the other information associated with all of the plurality of subentries that store different memory page start addresses and associated lengths; and
   a selection logic module to determine an order to transmit memory transaction commands stored in the plurality of memory entries and transmit the stored memory transaction commands according to the determined order to a memory interface.

2. The computer memory controller apparatus of claim 1, wherein:
the placement logic module combines the received memory transaction command with the previously stored memory transaction command when the received memory transaction command and the previously stored memory transaction command access contiguous memory ranges; and
the combined memory transaction command is different from both the received memory transaction command and the previously stored memory transaction command in that the combined memory transaction command accesses the contiguous memory ranges of both the received memory transaction command and the previously stored memory transaction command.

3. The computer memory controller apparatus of claim 1, wherein:
each of the different memory page start addresses and associated lengths corresponding to a different one of a plurality of received memory transaction commands that access a same memory page;
the placement logic module combines the received memory transaction command with the previously stored memory transaction command when the received memory transaction command and the previously stored memory transaction command access a same memory page; and
the combined memory transaction command includes a separate memory page start address and associated length for each of the received and previously stored memory transaction commands that are combined.

4. The computer memory controller apparatus of claim 3, wherein the selection logic module transmits a separate memory transaction command to the memory interface for each of the plurality of subentries that store different memory page start addresses in the same one of the plurality of memory entries for the combined memory transaction command.

5. The computer memory controller apparatus of claim 3, wherein the placement logic module combines the received memory transaction command with the previously stored memory transaction command even when the received memory transaction command and the previously stored memory transaction command do not access contiguous memory ranges.

6. The computer memory controller apparatus of claim 1, wherein:
the placement logic module compares the received memory transaction command with each of the memory transaction commands previously stored in the plurality of memory entries of the command queue, and
in response to the placement logic module determining, according to a result of the comparing, that the received memory transaction command is a candidate for combining with one of the memory transaction commands previously stored in the plurality of memory entries of the command queue according to at least one matching condition selected from the group consisting of accessing contiguous memory ranges and accessing a same memory page, the placement logic module updates the memory entry storing the one of the previously stored memory transaction commands according to the received memory transaction command that is a candidate for combining.

7. The computer memory controller apparatus of claim 6, wherein the placement logic module determines that the received memory transaction command is a candidate for combining with one of the memory transaction commands previously stored in the plurality of memory entries of the command queue further according to one or more matching conditions selected from the group consisting of a same command type, a same ID, and no priority collisions.

8. A method of controlling computer memory, the method comprising:
receiving, by one or more hardware processors, a memory transaction command from a data port;
comparing, by one or more hardware processors, the received memory transaction command with a memory transaction command previously stored in one of a plurality of memory entries of a command queue, each memory entry of the plurality of memory entries including a plurality of subentries to store different memory page start addresses and associated lengths, each memory entry of the plurality of memory entries further including an additional subentry to store a single copy of other information associated with all of the plurality of subentries that store different memory page start addresses and associated lengths, and the other information including at least one of bank address, row address, a burst type, or a page status;
determining, by one or more hardware processors, according to a result of the comparing, whether the received memory transaction command is a candidate for combining with the memory transaction command previously stored in the one of the plurality of memory entries of the command queue according to at least one matching condition selected from the group consisting of accessing contiguous memory ranges and accessing a same memory page;
in response to determining that the received memory transaction command is a candidate for combining, combining, by one or more hardware processors, the received memory transaction command with the previously stored memory transaction command, the combined memory transaction command shares the single copy of the other information associated with all of the plurality of subentries that store different memory page start addresses and associated lengths;
determining, by one or more hardware processors, an order to transmit the memory transaction commands stored in the plurality of memory entries of the command queue; and
transmitting, by one or more hardware processors, the combined memory transaction command from the command queue to a memory interface according to the determined order.

9. The method of claim 8, wherein:
the at least one matching condition is determined to be met when the received memory transaction command and the previously stored memory transaction command access contiguous memory ranges; and
the combined memory transaction command is different from both the received memory transaction command and the previously stored memory transaction command in that the combined memory transaction command accesses the contiguous memory ranges of both the received memory transaction command and the previously stored memory transaction command.

10. The method of claim 8, wherein:
the received memory transaction command is determined to be a candidate for combining when the received memory transaction command and the previously stored memory transaction command access a same memory page;

combining the candidate received memory transaction command with the previously stored memory transaction command includes storing a memory page start address and associated length for the received memory transaction command in the same memory entry of the command queue as the previously stored memory transaction command in addition to the previously stored memory page start address and associated length of the previously stored memory transaction command, wherein each of the different memory page start addresses and associated lengths corresponding to a different one of a plurality of received memory transaction commands that access a same memory page.

11. The method of claim 10, wherein transmitting the combined memory transaction command comprises transmitting a separate memory transaction command for each of the plurality of subentries that store different memory page start addresses and associated lengths for the combined memory transaction command.

12. The method of claim 10, wherein the received memory transaction command is combined with the previously stored memory transaction command even when the received memory transaction command and the previously stored memory transaction command do not access contiguous memory ranges.

13. The method of claim 8, further comprising:
comparing, by one or more hardware processors, the received memory transaction command with each of a plurality of memory transaction commands previously stored in the plurality of memory entries of the command queue, and determining, by one or more hardware processors, according to a result of the comparing, whether the received memory transaction command is a candidate for combining with each of the plurality of memory transaction commands previously stored in the plurality of memory entries of the command queue.

14. The method of claim 10, wherein the received memory transaction command is determined to be a candidate for combining with the previously stored memory transaction command according to at least one further matching condition selected from the group consisting of a same command type, a same ID, and no priority collisions.

15. A non-transitory computer readable medium comprising instructions that, when executed by one or more processors of a computing device, cause the computing device to perform operations comprising:
selecting elements of a computer memory controller to control a command queue that receives memory transaction commands from a data bus, stores the received memory transaction commands in a plurality of memory entries, and transmits the stored memory transaction commands to a memory interface;

configuring a port interface to be coupled with a data bus to receive memory transaction commands;

configuring a command queue to be coupled with the port interface and include:

a plurality of memory entries to store memory transaction commands, each memory entry including a plurality of subentries to store different memory page start addresses and associated lengths, each memory entry further including an additional subentry to store a single copy of other information associated with all of the plurality of subentries that store different memory page start addresses and associated lengths, and the other information including at least one of bank address, row address, a burst type, or a page status;

a placement logic module to combine a received memory transaction command with a memory transaction command previously stored in one of the plurality of memory entries of the command queue, the combined memory transaction command shares the single copy of the other information associated with all of the plurality of subentries that store different memory page start addresses and associated lengths; and a selection logic module to determine an order to transmit memory transaction commands stored in the plurality of memory entries and transmit the stored memory transaction commands according to the determined order to a memory interface; and generating a circuit design file comprising the computer memory controller.

16. The non-transitory computer readable medium of claim 15 further comprising instructions that cause the computing device to configure:
the placement logic module to combine the received memory transaction command with the previously stored memory transaction command when the received memory transaction command and the previously stored memory transaction command access contiguous memory ranges; and the combined memory transaction command to be different from both the received memory transaction command and the previously stored memory transaction command in that the combined memory transaction command accesses the contiguous memory ranges of both the received memory transaction command and the previously stored memory transaction command.

17. The non-transitory computer readable medium of claim 15 further comprising instructions that cause the computing device to configure:
each of the different memory page start addresses and associated lengths corresponding to a different one of a plurality of received memory transaction commands that access a same memory page;

the placement logic module to combine the received memory transaction command with the previously stored memory transaction command when the received memory transaction command and the previously stored memory transaction command access a same memory page; and wherein the combined memory transaction command includes a separate memory page start address and associated length for each of the received and previously stored memory transaction commands that are combined.

18. The non-transitory computer readable medium of claim 17 further comprising instructions that cause the computing device to configure:
the selection logic module to transmit a separate memory transaction command to the memory interface for each of the plurality of subentries that store different memory page start addresses in the same one of the plurality of memory entries for the combined memory transaction command.

19. The non-transitory computer readable medium of claim 17 further comprising instructions that cause the computing device to configure:
the placement logic module to combine the received memory transaction command with the previously stored memory transaction command even when the received memory transaction command and the previously stored memory transaction command do not access contiguous memory ranges.

20. The non-transitory computer readable medium of claim 15 further comprising instructions that cause the computing device to configure:

the placement logic module to compare the received memory transaction command with each of the memory transaction commands previously stored in the plurality of memory entries of the command queue, and in response to determining that the placement logic module determines, according to a result of the comparing, the received memory transaction command is a candidate for combining with one of the memory transaction commands previously stored in the plurality of memory entries of the command queue according to at least one matching condition selected from the group consisting of accessing contiguous memory ranges and accessing a same memory page, the placement logic module to update the memory entry storing the one of the previously stored memory transaction commands according to the received memory transaction command that is a candidate for combining.

* * * * *